Feb. 23, 1954
R. L. ERWIN
2,669,951
PLANTER VALVE
Filed Nov. 23, 1951
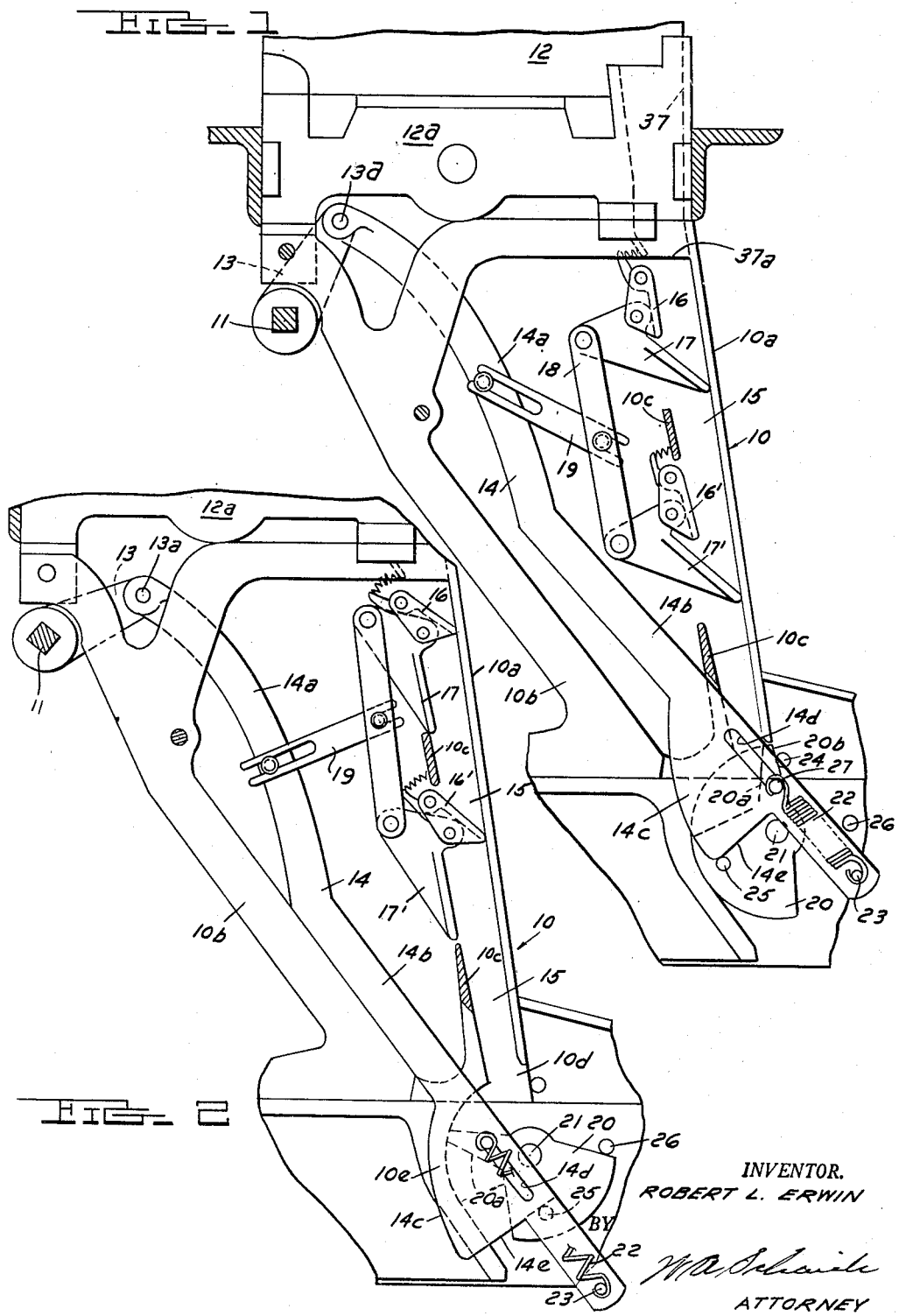
INVENTOR.
ROBERT L. ERWIN
BY
*W. A. Schmidt*
ATTORNEY

Patented Feb. 23, 1954

2,669,951

UNITED STATES PATENT OFFICE 2,669,951

PLANTER VALVE

Robert L. Erwin, Royal Oak, Mich., assignor to Dearborn Motors Corporation, Birmingham, Mich., a corporation of Delaware Application November 23, 1951, Serial No. 257,885

1 Claim. (Cl. 111—51)

This invention relates to an improved seed valve for check row planters.

Check row planters are most commonly utilized for planting corn in hills at equidistantly spaced intervals and each hill is also placed in alignment with the hill in the adjacent row to enable cultivation of the growing corn crop in crosswise directions. This type of planting permits such cultivation for better weed control.

When corn planters were horse drawn uniformity of planting was relatively easily obtained in spite of slight inaccuracies of the seed dropping mechanism because of the slow speeds at which the planter was drawn. With the high planting speeds now available with the present day tractor, any slight defect in the accuracy of the planter mechanism quickly shows up. This is particularly true if the planter valves do not open with a uniform rate of speed. At high planting speeds a nonuniform rate of valve opening will seriously affect the spacing of the seed plantings. Hence, the plants in the rows will not be in perfect alignment which will make it difficult to cultivate the crop without destroying many of the growing plants.

Accordingly, it is an object of this invention to provide an improved planter valve for a high speed check row planter which is of simple design and hence economically manufacturable.

Another object of this invention is to provide an improved planter valve for a seed planter which opens with the same uniform rate of speed each time such valve is actuated.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is an enlarged sectional view of a planter valve housing or seed boot showing the improved valve constructed in accordance with this invention assembled in such housing with the valve in the loading position; and Figure 2 is a view similar to Figure 1 but showing the valve in its unloading position.

As shown on the drawings:

The planter valve of this invention to be presently described is conveniently utilized with a planter of the type illustrated and described in my co-pending patent application for Check Row Planter Valve, Serial No. 186,194, filed September 22, 1950, and assigned to the assignee of this invention. In such application there is disclosed a multiple stage valve which permits the use of higher tractor speeds in planting by virtue of the valves being operable to reduce by stages the distance a group of seeds selected by the seed planting mechanism has to fall. Accordingly, Figures 1 and 2 show a valve housing 10 similar to the one disclosed in my above mentioned co-pending patent application. The valve housing 10 is secured in depending relationship to the underside of the base portion 12a of a seed hopper 12 in a suitable manner. Housing 10 is of substantially triangular configuration having a rearwardly disposed side 10a which joins the base portion 12a of hopper 12 at substantially right angles.

The improved planter valve of this invention is preferably operated by a check wire conveniently utilized with check row planters. The check wire (not shown) is engageable with a conventional tripping device (not shown) mounted on the planter which intermittently oscillates a square shaft 11 at intervals proportional to the ground speed of the planter. Shaft 11 is disposed transversely of the planter underneath the upper forward edge of housing 10 as shown in Figures 1 and 2. A crank arm 13 is non-rotatably secured to shaft 11 and such crank arm projects through a suitable aperture into housing 10. A valve actuating member 14 is pivotally connected to crank arm 13 as by pin 13a for actuation of the planter valves contained in housing 10 as will be presently described. Valve actuating member 14 has an arcuate upper portion 14a while the lower portion 14b of such member is straight and lies substantially parallel to the forwardly facing side 10b of housing 10. Adjacent the lower end of actuator 14 there is provided an integral outwardly projecting lug portion 14c. Lug 14c is of substantially triangular configuration and has a downwardly facing surface 14e perpendicularly disposed to the straight portion of actuator 14 for a purpose to be later described. A longitudinal slot 14d is provided in the straight portion 14b of actuator 14 opposite the lug portion 14c.

Adjacent the rear interior edge of hopper 12 there is provided a vertically disposed passageway 37 which projects through base portion 12a and communicates with the interior of housing 10 as shown at 37a. Immediately below the passageway 37 a seed chute 15 is defined by an integral transverse wall 10c transversely cast into housing 10 and the internal surface of rear wall 10a. The wall 10c is, however, apertured near both its top and bottom portions to respectively mount a set of top valves 16 and 17 and a second set of identical intermediate valves 16' and 17' and to permit such valves to swing into and out of the seed chute 15 between open and closed positions relative to such seed chute. The intermediate set of valves 16' and 17' are constructed and mounted identically to the top set of valves 38 and 39. Actuation movement is imparted to the top valves 16 and 17 and the intermediate set of valves 16' and 17' by a link 18. Link 18 is moved by a rocker member 19. A more complete description of the construction and operation of the top and intermediate valves may be had by reference to my aforementioned co-pending patent application. Inasmuch as the operation of such valves is incidental to the operation of the instant improved planter valve, further description is not believed necessary.

Adjacent the bottom opening 10d of seed chute 15, interior wall 10c terminates in an arcuate downwardly projecting portion 10e. A substantially semi-circular valve element 20 is rotatably mounted in the lower portion of housing 10 with its axis disposed below and substantially opposite the opening 10d. A suitable stud 21 secured to the face of housing 10 permits mounting the valve element 20 thereon. A segment-like portion of the semi-circular valve element is removed to define a seed pocket 20a. The outer periphery of semi-circular valve element 20 slidably engages the arcuate portion of the bottom end 10e of side wall 10c. The seed pocket 20a defines an arm 20b of valve element 20 and a transverse pin 27 is secured in such arm. The pin 27 slidably projects through the slot 14d provided adjacent the lower end of actuator 14 and a spring 22 has its upper end looped about the pin 27 as shown in Figures 1 and 2. The lower end of spring 22 is looped about a pin 23 secured transversely in the extreme lower end of actuator 14. Thus when the actuator is in the position shown in Figure 1, spring 22 maintains the valve element 20 in the loading position shown in Figure 1 wherein the seed pocket 20a communicates with the bottom opening 10d of seed chute 15. A stop 24 limits rotary movement of valve element 20 in a clockwise direction so as to align the seed pocket 20a with the bottom opening 10d. A transverse pin 25 suitably secured to the valve element 20 adjacent the opposite edge of pocket 20a is so positioned as to contact the bottom edge 14e of actuator lug 14c when the actuator is in the position shown in Figure 1.

When the trip wire (not shown) effects rotation of square shaft 11 in a clockwise direction the actuator 14 is forced to move downwardly whereupon the top valves 16 and 17 and intermediate valves 16' and 17' are operated in the manner described in my aforementioned co-pending application to drop a group of seeds successively from the top valves to the intermediate valves received from the seed selecting apparatus of the planter (not shown) to deposit a group of seeds into the seed receiving pocket 20a of valve 20. Downward movement of actuator 14 initiates rotation of valve element 20 by virtue of the contact of the bottom surface 14e of lug 14c with the pin 25. A counterclockwise movement is thus imparted to the rotary valve element 20; hence pin 27 rotates in its orbit which effects shifting of actuator 14 to the left as shown in Figure 2.

After the actuator has been forced downwardly a predetermined amount, pin 27 will have been rotated in a counterclockwise direction to move the lower end of actuator 14 past the center of pin 21 whereupon spring 22, which has been tensioned by the downward movement of the reciprocating actuating member 14, will then effect rapid and automatic rotation of the rotary valve element 20 to position such valve element at what may be termed its unloading position wherein the seed receiving pocket 20a opens downwardly for discharge of the seeds contained in such pocket to the furrow. A suitable stop pin 26 limits the counterclockwise rotation of valve element 20. The counterclockwise or return movement of shaft 11 rotates crank 13 in a counterclockwise direction to move actuator 14 toward its upper position whereupon slot 14d cams the rotary valve element 20 to dead-center relationship with spring 22, whereupon the rotational momentum of valve element 20 swings the assemblage past dead-center to assume the position shown in Figure 1 thereby reseating the valve and the over center spring to receive another charge or group of seeds from the valves 16' and 17'. It should be mentioned here that the extreme lower end portion of actuator 14 adjacent the bottom edge 14e of lug 14c is suitably offset or other clearance provided to permit the passage of pin 25 thereunder when valve 20 is rotated to its discharge position as shown in Figure 2.

From the foregoing description it is clearly apparent that there is here provided an improved planter valve which is of relatively simple construction to insure long trouble-free life. In addition, the over center spring effects a uniform rate of movement of the valve which positively guarantees the same valve opening timing and therefore permits a much more uniform spacing of the dropped seed.

It will, of course, be understood that various details of construction may be varied through a wide range without departing from the principles of this invention and it is, therefore, not the purpose to limit the patent granted hereon otherwise than necessitated by the scope of the appended claim.

I claim:

In a planter having a housing and a seed chute in the housing, a valve element mounted in the housing for rotatable movement between a loading and a discharging position, said valve element having a seed receiving pocket constructed and arranged to intercept the seed chute in the loading position of said valve element, an actuator mounted in the seed chute for reciprocable movement, and crank means for reciprocating said actuator; the improvement comprising a pin secured to said valve element, said actuator having a slot receiving said pin, said slot extending in general alignment with the path of reciprocable movement of said actuator, a spring operatively connected between said actuator and said valve element, said spring having one end thereof connected to said pin and being disposed to assume an over-center relationship with respect to the rotary axis of said valve element at a position of said valve element intermediate said loading and discharge positions, and means on said actuator detachably engageable with said valve element for initiating rotation of said valve element toward discharging position.

ROBERT L. ERWIN.

References Cited in the file of this patent

UNITED STATES PATENTS

| Number | Name | Date |
| --- | --- | --- |
| 1,152,338 | Nixon | Aug. 31, 1915 |
| 1,783,032 | Ayers | Nov. 25, 1930 |
| 2,199,422 | Stevens | May 7, 1940 |
| 2,362,387 | Ludwig | Nov. 7, 1944 |